Patented Mar. 4, 1952

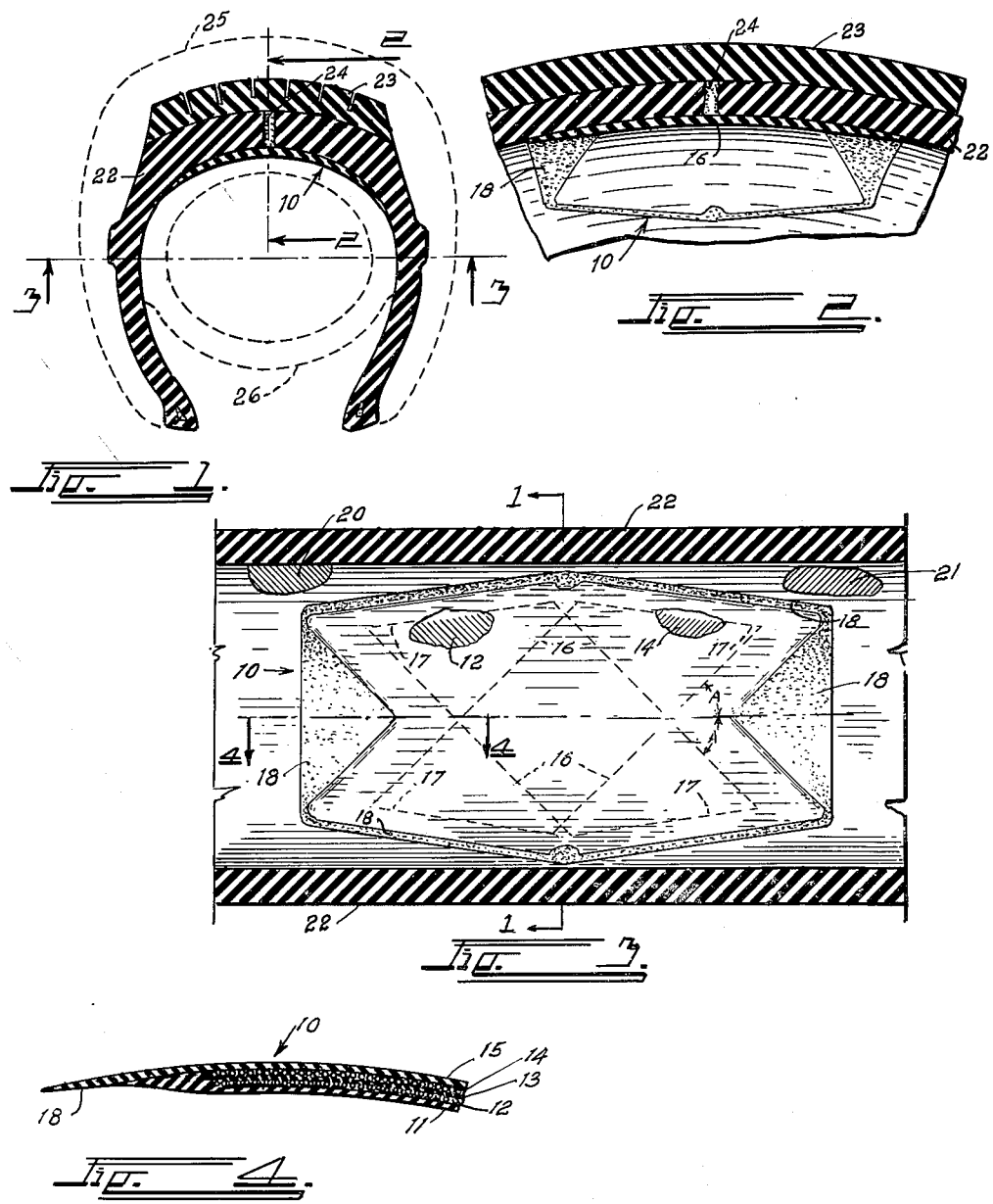

2,587,759

UNITED STATES PATENT OFFICE 2,587,759

TIRE PATCH

Lloyd L. Pierce and Edward J. White, Denver, Colo., assignors to The Gates Rubber Company, Denver, Colo., a corporation of Colorado Application April 1, 1949, Serial No. 84,786

1 Claim. (Cl. 152—367)

This invention relates to improvements in recapped tires and tire patches employed therewith.

In the recapping of tires it is often necessary to make certain repairs to a tire prior to the recapping operation. Thus, if there are large nail holes, or other injuries, in the tire casing, it is common practice to apply a patch over the hole and cure the patch in a section mold. If there are several injuries at widely spaced points, it may be necessary to cure each patch separately because the section mold extends around only a minor portion of the tire periphery. After the foregoing operation or operations are completed, the recapping material is applied and the tire is cured, usually in a recap full circle mold.

It has been found more expedient, rather than to separately cure the patch and recap as above discussed, to effect the cure of the patch and recap simultaneously in the recap mold. To obtain optimum results in effecting a durable and permanent repair of the casing it has been found that the patch must be of a certain predetermined shape and thickness relative to the tire casing and be installed in a definite relation to the tire cords as will hereinafter more fully appear.

The principal object of the invention is to provide a patch which is pre-shaped in such manner that it conforms to the contours of the tire with its crossing reinforcing cords lying substantially parallel, respectively, to crossing cords in the tire.

Another object is to provide a patch of the foregoing type in which the cords of a reinforcing layer of the patch terminate varying distances beyond a cord in the tire which exends in a direction transverse to the cords of the patch.

A further object is to provide a semi-cured preshaped patch, reinforced by nylon cords.

Still further objects, advantages, and salient features will become apparent from a consideration of the description to follow, the appended claim, and the accompanying drawing, in which:

Figure 1 is a transverse section of a tire, with the novel patch thereon, shown during the curing operation, taken on line 1—1, Figure 3;

Figure 2 is a section taken on line 2—2, Figure 1;

Figure 3 is a section taken on line 3—3, Figure 1; portions of the patch and tire being broken away to show cord layers therein; and Figure 4 is a section taken on line 4—4, Figure 3.

Referring in detail to the drawing and particularly to Figure 4, the patch 10 comprises a layer of rubber 11, a layer of parallel cords 12, another layer of rubber 13, another layer of parallel cords 14 and a cushion layer 15. The cord layers 12 and 14 cross each other as shown by the dotted lines and broken away portions in Figure 3, the diamond shaped area formed by dotted lines 16, where they cross, being reinforced by both cord layers. The cords of each layer extend beyond this area and their ends terminate at an angle to the sides of the diamond as shown by dotted lines 17. Thus each layer is parallelogram shaped as indicated by the dotted lines, with a diamond shaped crossing area.

In forming the patch, the layers, except the cushion gum, are built up and semi-cured in a suitable mold which has the same shape as the inside surface of the tire in which the patch is to be used. After being semi-cured, it therefore has a shape which is circular in all longitudinal planes, as shown in Figure 2, and is transversely curved at all transverse planes as shown in Figure 1. After the patch has been semi-cured, the uncured cushion gum 15 is applied, the latter extending beyond the cords at all points to provide borders 18 of cushion gum. The cushion gum is then covered with a suitable metal foil or other material to protect it until the patch is to be used.

When it is desired to apply the patch of this invention to a damaged tire 22 which is to be recapped, the surface of the tire is prepared in the usual manner and the recap material 23 applied thereto. Either before or after this operation, the inside of the tire, adjacent the injury, such as the hole or break 24 in the cords at the crown of the tire, is cleaned in the normal manner and cement applied to the casing. The patch is then applied as shown in Figure 3. It is to be particularly observed that the cords 12 of the patch lie in parallel relation to cords 20 of the tire and cords 14 of the patch lie parallel to cords 21 of another cord layer of the tire. Thus, when the patch is applied with its longitudinal axis parallel to the tire bead, the patch not only conforms to the shape of the tire but the cords 12, 14 lie parallel to respective cords 20, 21 of the tire.

After the patch has been applied to the tire it is placed in a suitable mold 25 and expansible bag 26 applied to the inside of the tire. The semi-cure of the patch is such that by the time the recap material has cured, the patch has also completely cured.

The patch has been described as containing two cord layers. It is to be understood that this is for the purpose of exemplification only and that it may contain as many cord layers as desired, the additional layers being superimposed on the two described, the cords of alternate layers being parallel in the same manner as the cords of a tire. Regardless of the number of layers employed, the number usually will be less than the number of cord layers in the tire. This is possible without sacrifice of strength to the tire wall because the cords are of nylon which is considerably stronger then the tire cords normally used. As an example, the two cord layer construction may be employed in a four-ply cord tire which has cords of cotton, rayon, or the like, and the tire will have as much strength at the point of injury had a four-ply patch been applied wherein the patch was provided with cords the same as used in the tire. The thinner, lighter weight patch has definite advantages over a heavier patch for the same purpose. Its thinness permits it to cure out more quickly and also renders the tire wall more flexible at the point where the patch is applied. The lightness reduces out-of-balance of the tire which reduces tire wobble and vertical thumps of the tire when in use. The patch is much easier to install than a heavier patch owing to its thinness and preformed shape, and of course, saves much time in recapping the tires since the repair of the injury and recapping are performed in one curing operation, rather than two. The fact that that the patch cords lie parallel to the tire cords is to be particularly noted, also. With this construction the patch cords, in effect, bridge the broken cords and pull with them rather than against them as would occur if the cords were in non-parallel relation. Thus the tire cords flex in the same manner, in the region of the patch, as they do elsewhere in the tire.

The angle "A" between the circumferential center line of the tire cords 20 or 21 varies somewhat in different tires, being usually somewhere between 36° and 42°, or to give an angle of crossing of 2A or 72° to 84°. The angle at which the cords of the patch cross may be identical with the angle of crossing of the tire cords or, if desired, be somewhere within the range so that they will lie substantially parallel with the tire cords.

The manner in which the ends of the reinforcing cords of the patch terminate at an angle to a crossing layer thereof, as shown by lines 17 is of particular importance. With this construction the terminating ends vary in distance from a cord in the tire which is disposed transversely of the reinforcing cords and more uniformly distributes the stresses in the tire wall, resulting in greater flexibility.

It now becomes apparent that this invention not only discloses a more expedient manner in which to recap and repair a tire but also produces an improved recap tire. While a two-ply patch has been illustrated, it is to be understood that this is exemplary only and that any number of plies or cord layers may be employed. For example, the two-ply patch is applicable to four-ply tires but if the tire has more than four plies, the number of patch plies may be increased, accordingly. Its size may be varied, also, for a particular tire and if the injury in the tire be large the area formed by lines 16 is increased. While the patch is particularly adapted for use in connection with recapping, it may be employed as a stick-in patch or vulcanized to a tire which requires repair, but not recapping. Modifications will become apparent to those skilled in the art and it is not intended to limit the invention to the precise disclosure except as defined by the scope of the appended claim.

Having described the invention what is claimed as new is:

A tire patch having layers of cords which cross each other at the same angle as the cords of a tire to which the patch is to be applied, the cords of each layer extending beyond the crossing area of the layers, the length of the cords of each layer from their ends to the point of juncture of a crossing cord varying uniformly across the width of a layer, whereby their ends lie in a line oblique to a crossing cord, a layer of semi-cured unreinforced rubber on one side of the patch, the patch being preformed to conform to the shape of the tire, and a layer of uncured unreinforced rubber on the other side of the patch adapted to abut the tire when the patch is inserted therein, said layers of rubber extending beyond the cords and being joined together forming an unreinforced margin around the cords.

LLOYD L. PIERCE.
EDWARD J. WHITE.

REFERENCES CITED

The following references are of record in the file of this patent:

UNITED STATES PATENTS

| Number | Name | Date |
| --- | --- | --- |
| 1,534,989 | Peugh | Apr. 21, 1925 |
| 1,629,289 | Mueller et al. | May 17, 1927 |
| 1,648,729 | Hawkinson | Nov. 8, 1927 |
| 1,653,162 | Forman | Dec. 20, 1927 |
| 1,832,802 | Zimmerman | Nov. 17, 1931 |
| 2,012,935 | Smith et al. | Aug. 27, 1935 |
| 2,317,911 | Hoff | Apr. 27, 1943 |
| 2,344,677 | Cornell | Mar. 21, 1944 |

FOREIGN PATENTS

| Number | Country | Date |
| --- | --- | --- |
| 648,929 | France | Aug. 21, 1928 |